US008867418B2

(12) United States Patent
Mishra et al.

(10) Patent No.: US 8,867,418 B2
(45) Date of Patent: Oct. 21, 2014

(54) METHODS OF INCORPORATING AN AD HOC CELLULAR NETWORK INTO A FIXED CELLULAR NETWORK

(71) Applicant: Parallel Wireless Inc., Nashua, NH (US)

(72) Inventors: Rajesh Kumar Mishra, Westford, MA (US); Steven Paul Papa, Windham, NH (US); Kaitki Agarwal, Westford, MA (US); Sridhar Donepudi, Nashua, NH (US); Kartik Shashikant Raval, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/183,176

(22) Filed: Feb. 18, 2014

(65) Prior Publication Data

US 2014/0233412 A1 Aug. 21, 2014

Related U.S. Application Data

(60) Provisional application No. 61/765,729, filed on Feb. 17, 2013, provisional application No. 61/858,035, filed on Jul. 24, 2013, provisional application No. 61/926,620, filed on Jan. 13, 2014.

(51) Int. Cl.
*H04B 7/00* (2006.01)
*H04W 92/02* (2009.01)
*H04L 12/66* (2006.01)

(52) U.S. Cl.
CPC ............. *H04W 92/02* (2013.01); *H04L 12/66* (2013.01)
USPC ...................................... 370/310.2; 370/328

(58) Field of Classification Search
CPC ......... H04L 2012/5608; H04W 84/12; H04W 88/08; H04W 80/04; H04W 88/06; H04W 84/18; H04W 74/08
USPC ............................. 370/310.2, 254, 338, 349
See application file for complete search history.

(56) References Cited

U.S. PATENT DOCUMENTS

| 8,019,331 | B2 | 9/2011 | Khetawat et al. |
| 8,358,577 | B1 | 1/2013 | Khanka et al. |
| 8,385,332 | B2 | 2/2013 | Aggarwal |
| 8,521,172 | B2 | 8/2013 | Rosenau |
| 8,526,961 | B2 | 9/2013 | Sanders et al. |

(Continued)

FOREIGN PATENT DOCUMENTS

WO WO 2011/157486 12/2011

*Primary Examiner* — Brenda H Pham
(74) *Attorney, Agent, or Firm* — Anne-Marie Dinius; Michael Y. Saji

(57) ABSTRACT

In this invention, we disclose methods directed toward integrating an ad hoc cellular network into a fixed cellular network. The methods disclosed herein automate the creation and integration of these networks. In additional embodiments, we disclose methods for establishing a stand-alone, ad hoc cellular network. In either of these implementations, we integrate or establish an ad hoc cellular network using mobile ad hoc cellular base stations configured to transmit and receive over a variety of frequencies, protocols, and duplexing schemes. The methods flexibly and dynamically choose an access or backhaul configuration and radio characteristics to optimize network performance. Additional embodiments provide for enhancing an existing network's coverage as needed, establishing a local network in the event of a loss of backhaul coverage to the core network, and providing local wireless access service within the ad hoc cellular network.

34 Claims, 14 Drawing Sheets

(56) References Cited

U.S. PATENT DOCUMENTS

| | | |
|---|---|---|
| 2004/0063451 A1* | 4/2004 | Bonta et al. .............. 455/519 |
| 2008/0261602 A1 | 10/2008 | Livneh |
| 2009/0312022 A1 | 12/2009 | Viorel et al. |
| 2011/0090869 A1 | 4/2011 | Tian et al. |
| 2011/0235568 A1 | 9/2011 | Esteves et al. |
| 2012/0033603 A1 | 2/2012 | Seo et al. |
| 2013/0184000 A1 | 7/2013 | Cook et al. |
| 2013/0195012 A1 | 8/2013 | Laitila et al. |
| 2013/0308470 A1 | 11/2013 | Bevan et al. |

* cited by examiner

METHODS OF INCORPORATING AN AD HOC CELLULAR NETWORK INTO A FIXED CELLULAR NETWORK

CROSS-REFERENCE TO RELATED APPLICATIONS

This application claims priority to the following U.S. Provisional Patent Applications: No. 61/765,729, entitled "Situation Aware Mobile Wireless Base Station for First Responders," filed Feb. 17, 2013 U.S. Provisional Patent Application No. 61/858,035 entitled "Situation Aware Mobile Wireless Base Station for First Responders with RSSI Measurement," filed on Jul. 24, 2013; and U.S. Provisional Patent Application No. 61/926,620 entitled "Situation Aware Mobile Wireless Base Station for First Responders," filed on Jan. 13, 2014 the entire contents of which are hereby incorporated by reference.

FIELD

The present invention relates generally to wireless multimedia telecommunications. More specifically, this invention relates to methods of incorporating an ad hoc cellular network into an existing fixed cellular network.

BACKGROUND

Historically, wireless networks have been homogeneous across several dimensions: radio access technology, macro versus small cell or femto cell, and hub and spoke versus a mesh network. Each of these wireless communication networks has its strengths and weaknesses. Fixed cellular macro networks suffer from dead spots, storm related outages, impeded coverage in inclement weather, difficulty providing in-building coverage, dropped calls on hand-overs, susceptibility to jamming, and so forth. Small cell access points have limited range. And mobile ad hoc networks are good for a small team working on a joint mission, but historically these networks have been stand-alone.

Wireless multimedia services are typically delivered through a series of macro base stations placed on towers or other strategic locations. This architectural layout applies to civilian and public safety networks. Irrespective of the end-user, the demand being placed on macro networks is exceeding macro network capabilities. On the public safety side, interoperability among different public safety departments and ensuring reliable coverage in hard-to-reach zones, such as in-building, have also been major challenges for the towns and municipalities that provide wireless multimedia services to public safety officials.

Recently, civilian operators have been finding ways to enhance cellular network coverage. For example, about 75% of all pro sports teams have added distributed antenna systems ("DAS") to their venues as a way of reducing the burden placed on the cellular macro network servicing the arena during game time. Although DAS enabled venues increase capacity, they are expensive to install and operate, and they do not provide mobility. DAS systems do not add any intelligence to the network. Instead, they simply act as repeaters.

Stepping back, cellular networks are inherently pre-planned networks. They do not form in an ad hoc fashion like a military ad hoc network. Although military ad hoc networks have the advantage of being ad hoc, their flexibility is limited to data channels within the same frequency band. In addition, military ad hoc networks do not integrate into existing cellular networks. Rather, they operate like independent islands.

When femto cells or repeaters are added to cellular networks, their integration is also preplanned. Femto cells provide cellular access using an Ethernet backhaul. Although they are moveable, they are nonetheless tied to a wired backhaul. Additionally, when a femto cell is moved, the operator of the femto cell must reconfigure the reintegration of the femto cell back into the existing network. In some femto cells, this reintegration can be accomplished by inputting the GPS coordinates of the femto cell. In other femto cells, interference mitigation can be accomplished by identifying any additional cellular base stations within range of the femto cell.

Repeaters are essentially amplifiers. Repeaters take the input signal, amplify it, and send it out. They do not change the frequency of the input signal, the protocol of the input signal, the duplexing scheme of the input signal and so forth.

Looking forward, industry leaders believe that heterogeneous networks will become more ubiquitous because they increase capacity. Heterogeneity, by its very definition, means being diverse in character or content. In wireless communication networks of the prior art, this could mean adding a small cell to a macro network, the heterogeneity being combining a small cell with a macro cell.

Some of the challenges of integrating small cells into a macro cellular network include: backhauling the traffic to the cell site, which can be expensive and inefficient; finding a site for outdoor small cells; and managing a network filled with macro cells and small cells. This is heterogeneity at a base station level.

In another example, military radios may have channel diversity in that they could assign different channels to users within a network, each channel having a different frequency. This could be seen as frequency heterogeneity or diversity. But the frequencies assigned within this network would all be within a particular frequency band. And so managing this network is fairly straightforward because there is one owner for the frequency band and therefore only one set of management principles governing the frequency band.

While these examples show some heterogeneity in the prior art, there is a need for furthering the concept of heterogeneity because by doing so, network capacity increases markedly. Heterogeneity can and should exist beyond the base station level. Specifically, the prior art lacks heterogeneity at the network level, that is combining various networks together such as an ad hoc cellular network with a fixed cellular network. There is therefore a need for managing ad hoc cellular networks in such a way as to seamlessly integrate them into and enhances the coverage of existing fixed cellular networks. There is also a need for dynamically leveraging myriad frequencies, protocols, duplexing schemes.

SUMMARY OF THE INVENTION

In this invention, we disclose methods for establishing or integrating an ad hoc cellular network into an existing cellular network. When an ad hoc cellular network is created as a stand-alone network, it is a heterogeneous network as that term is used herein. When the ad hoc cellular network is integrated into a fixed cellular network, the resulting combination is also a heterogeneous network as that term is used herein.

The ad hoc cellular networks created herein can be established with a single ad hoc cellular base station or with more than one ad hoc cellular base stations. Ad hoc cellular base stations can be mobile or stationary. They can also be part of a semi-permanent installation. The difference between an ad hoc cellular base station and a fixed cellular node or fixed cellular base station is, ad hoc cellular base stations can be easily moved. They may remain at a particular location for many months, for example in a disaster recovery scenario, but they are designed to be moved easily. Fixed cellular base stations, on the other hand, are part of a fixed infrastructure. Their installation typically requires advanced planning Their installation, is, therefore, not ad hoc.

It is this fixed, advanced planning that the some of the methods of the disclosed embodiments overcome by automating hardware settings to accommodate varying operational parameters within a cellular network. Automating these procedures requires utilizing heterogeneous access and backhaul hardware that can be adapted to fit the network characteristics. It requires having the ability to dynamically alter hardware configurations in response to changing network dynamics. Accomplishing this requires measuring and analyzing network conditions and altering hardware settings as a result of the analysis to provide optimized ad hoc cellular networks.

Cellular base stations are traditionally deployed in fixed environments. Even mobile nodes known as Cell on Wheels ("COWS") are merely portable versions of fixed base stations. As such, their addition to an existing network requires careful planning, which can often mean reevaluating the operational parameters of existing base stations within a particular neighborhood. This type of enhancement of a network requires substantial advanced planning.

In contrast, the methods disclosed herein automate the integration of ad hoc cellular base stations into an existing cellular network. This automation accounts for managing the individual cellular base stations and bringing a high-level, end-to-end orchestration to the combined ad hoc and fixed cellular network. Even when embodiments described herein are used to create an independent ad hoc cellular network, they measure and analyze the operational parameters of existing cellular networks within range to ensure that their creation does not deleteriously affect the existing cellular networks within range.

The embodiments disclosed herein are executed on multi radio access technology nodes, which we refer to throughout as "ad hoc cellular base stations." Because the ad hoc cellular base stations incorporate multiple access and backhaul radios, they are able to operate over numerous frequencies, run a variety of protocols, use licensed or unlicensed spectrum, and use wired or wireless connectivity.

In embodiments of the invention, we disclose methods of establishing an ad hoc cellular network having an ad hoc cellular base station or integrating an ad hoc cellular base station into a fixed cellular network comprising the steps of: analyzing a speed to determine a mobility state of an ad hoc cellular base station; querying a local or remote cache stored in a computing server to determine a backhaul configuration or an access configuration for the ad hoc cellular base station; receiving the backhaul configuration or the access configuration for the ad hoc cellular base station from the local or remote cache; evaluating an operational parameter of a neighboring cellular base station; determining if the access configuration or backhaul configuration should be updated based on the operational parameter; and transmitting or receiving an access signal or a backhaul signal using the access configuration or the backhaul configuration. In an additional embodiment performing the previously listed steps, there could also be a second ad hoc cellular base station further comprising the steps of: receiving from a local or remote cache a second location, a second mobility state, or a second travel direction for a second ad hoc cellular base station within the ad hoc cellular network; evaluating at least one of the backhaul configuration, the access configuration, the second location, the second mobility state, or a second travel direction to determine if either the backhaul configuration or the access configuration should be changed to an updated backhaul configuration or an updated access configuration; and transmitting an access signal or a backhaul signal using the access configuration, the updated access configuration, the backhaul configuration, or the updated backhaul configuration. In yet additional embodiments, the speed is determined by using location data or direction data for the ad hoc cellular base station.

Alternate embodiments add to these embodiments the following: altering a power level of an access radio or a backhaul radio having transmit or receive hardware configured to operate over the access configuration or backhaul configuration; using a wireless mesh backhaul connection; and altering an antenna configuration based upon an access configuration or a backhaul configuration. In additional embodiments, building on these steps there could be communicating a decision to hand-off a data or voice session of a user being serviced by a source ad hoc cellular base station to a destination cellular base station; and exchanging messaging information between the source ad hoc cellular base station and the destination cellular base station. The could alternatively be communicating a decision to hand-in a data or voice session of a user being service by a source cellular base station to a destination ad hoc cellular base station; and exchanging messaging information between the source cellular base station and the destination ad hoc cellular base station.

In some embodiments the access signal or the backhaul signal use full duplex wireless communication. In some embodiments there could be additional steps of detecting a coverage gap; establishing at least one wireless backhaul connection to a core network using an antenna having a gain greater than 0 dB; and using the access configuration to transmit or receive signals on an access radio. There could also be a situation where the access configuration or the backhaul configuration is determined based on a power source of the ad hoc cellular base station. Alternatively there could be the access configuration or the backhaul configuration is determined based on an operational parameter of the ad hoc cellular network.

In further embodiments building thereon, there could be methods further comprising the ad hoc cellular base station authenticating a user equipment by using an already authenticated user communicating with other users within the ad hoc cellular network or assigning a priority to a user. An alternate embodiment could include a backhaul connection of the ad hoc cellular base station to a cellular network is given priority treatment based on an operational parameter of the ad hoc cellular base station. Additionally in some of these embodiments it is possible to exchange messaging information with a core cellular network, or to establishing a second backhaul connection using either a cellular or a mesh protocol between the ad hoc cellular base station and a second cellular base station.

In additional embodiments there could be a method of establishing an ad hoc cellular network having an ad hoc cellular base station or integrating an ad hoc cellular base station into a fixed cellular network comprising the steps of: establishing a wireless backhaul connection for an ad hoc cellular base station further comprising the steps of: receiving a data packet from an ad hoc cellular base station; extracting a tunnel overhead packet from the data packet so as to create a modified data packet; storing the tunnel overhead packet in a memory; forwarding the modified data packet to a second ad hoc cellular base station using an IP routing protocol; receiving an acknowledgement from the second ad hoc cellular base station indicating that an establishment of a bearer is complete; and anchoring an IP session to shield an external network from a backhaul IP change.

In alternate embodiments the data packet is an initial attach request or the modified data packet is forwarded to an evolved packet core. In an alternate embodiment, there could be the ad hoc cellular network providing situational awareness to a local user with a software application or a central database by providing at least one of: a location of an ad hoc cellular base station, a direction or travel of an ad hoc cellular base station, a mobility parameter for an ad hoc cellular base station, an environmental parameter for an ad hoc cellular base station, a coverage map of an ad-hoc cellular base station, an environmental parameter of a fixed base station, an operational parameter of a fixed base station, a location of a fixed base station, or a location of a user. In a further embodiment there could be monitoring a quality of the backhaul connection to the core network to determine if it falls below a threshold parameter; providing a local limited core network to the ad hoc network if the backhaul connection falls below the threshold parameter further comprising the steps of: the ad hoc cellular base station providing a minimal set of core network functionality to a user equipment within the ad hoc network on an access channel; Receiving an authentication information from a core network database having core authentication information stored therein; Storing the authentication information into a memory; and Using the authentication information to authenticate the user equipment.

In an alternate embodiment there could be managing the ad hoc cellular network; and providing a voice-over-IP application wherein the voice-over-IP application is chosen from the group consisting of: push-to-talk, peer-to-peer communication, an ad hoc user nationwide dialing plan; an ad hoc user international dialing plan, conference calling, or a speed dial list. An additional embodiment could comprise the steps of: a first ad hoc cellular base station detecting a third ad hoc cellular base station wherein the third ad hoc cellular base station has a processor having a limited core network functionality; and using a wired backhaul connection or a wireless backhaul connection to integrate the third ad hoc cellular base station into the ad hoc cellular network wherein the integration is performed by exchanging messaging information with the second ad hoc cellular base station.

In yet an additional embodiment, there could further comprise the steps of: determining if the quality of the backhaul connection to the core network exceeds the threshold parameter; and synchronizing the authentication information stored in the memory of the ad hoc cellular base station providing the limited core functionality with the core network database.

An alternate embodiment could be a method of establishing an ad hoc cellular network having an ad hoc cellular base station or integrating an ad hoc cellular base station into a fixed cellular network comprising the steps of: receiving a message sent from a user equipment operating in an existing cellular network, wherein the message is sent over a control or bearer channel; analyzing a characteristic of the message; analyzing an operational parameter of the existing cellular network; determining if an ad hoc cellular base station should enable, disable, or modify an access signal or a backhaul signal based on the analysis of the characteristic of the message or the operational parameter.

An additional embodiment could be a method of establishing an ad hoc cellular network having an ad hoc cellular base station or integrating an ad hoc cellular base station into a fixed cellular network comprising the steps of: optimizing a data path wherein the optimizing further comprises: receiving a first data packet from a user equipment at a first ad hoc cellular base station wherein the first ad hoc cellular base station includes a local gateway providing local wireless access; removing a first protocol header from the first data packet; storing the first protocol header in a memory; receiving a second data packet wherein the second data packet was sent from a second ad hoc node having processor with limited core network functionality stored theron; analyzing a plurality of data packet headers stored in the memory in order to determine which corresponds to the second data packet; and appending a second data packet header to the second data packet. In an alternate embodiment there could be a local packet data network gateway (LGW). Additionally an embodiment could further comprise establishing a closed network.

In an additional embodiment there could be a method of establishing an ad hoc cellular network having an ad hoc cellular base station or integrating an ad hoc cellular base station into a fixed cellular network comprising the steps of: a first ad hoc cellular base station establishing a first primary connection with a core cellular network; a second ad hoc cellular base station establishing a connection with the first ad hoc cellular base station; the second ad hoc cellular base station establishing a second primary connection with the core cellular network; determining if the quality of the first primary connection falls below a threshold parameter; and replacing the first primary connection with the second primary connection if the quality of the first primary connection falls below the threshold parameter. In some embodiments, the threshold parameter is determined by aggregating more than one threshold parameter and averaging the aggregated threshold parameters.

DEFINITIONS

Figure 1:
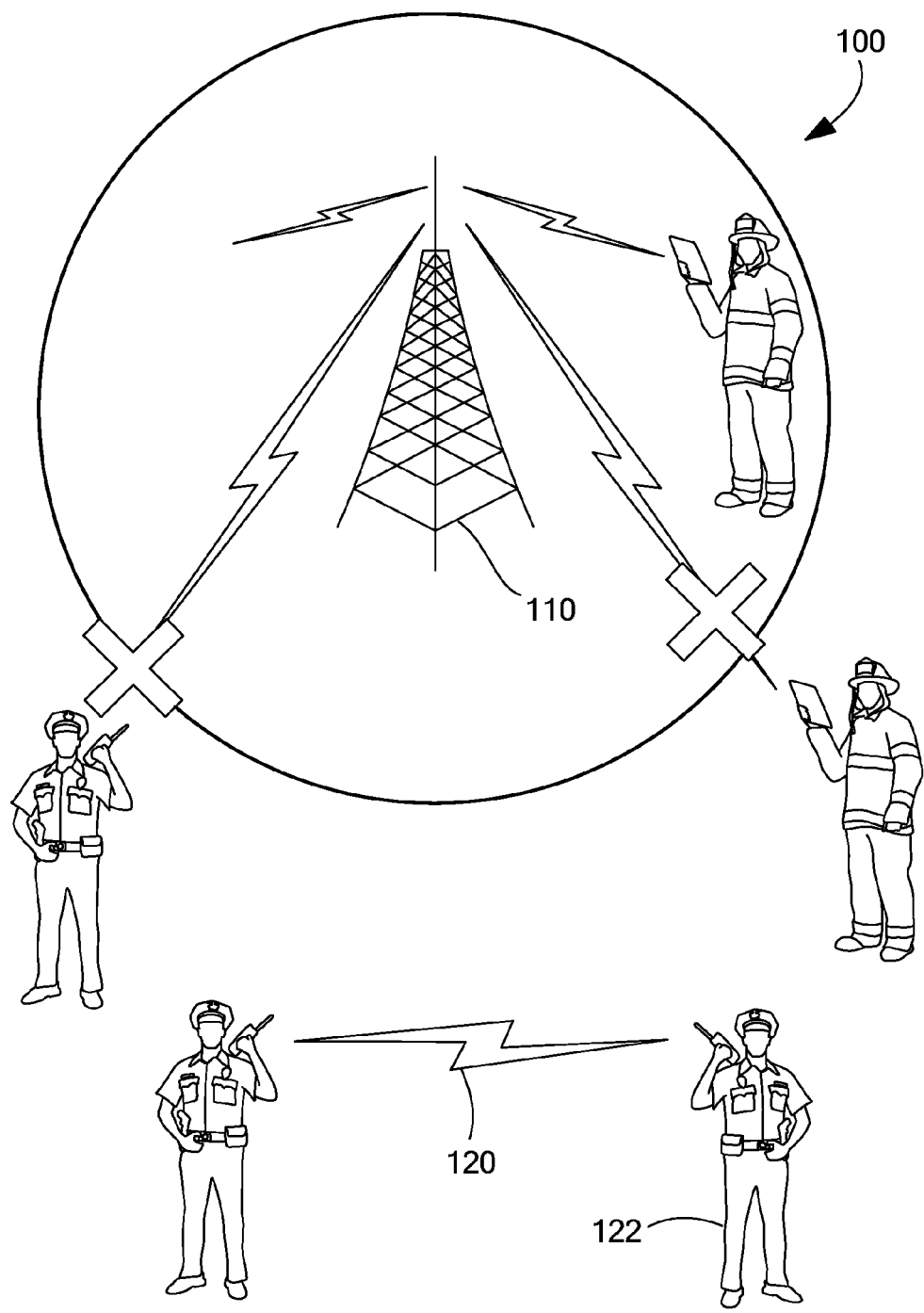
FIG. 1 is a prior art architectural rendering of a public safety cellular communication network.

Ad hoc cellular base stations can be mobile, stationary, or part of a semi-permanent installation. The difference between an ad hoc node and a fixed cellular base station is ad hoc cellular base stations can be easily moved. They may remain at a particular location for many months, but they are designed to be moved easily. Ad hoc cellular base stations are dynamic, heterogeneous nodes. Ad hoc cellular base stations may have computer readable instructions stored in memory that allow them to seamlessly integrate into existing cellular networks or to provided limited local wireless and core network functionality or services.

Ad hoc cellular network is a stand-alone network of ad hoc cellular base stations. These networks can be used by consumers, businesses, or for special purposes. Additionally they can be integrated into fixed networks. They can provide coverage in rural areas. They can enhance coverage of fixed networks. And they can be used to provide network services in areas where there is no network or where a natural or man-made disaster has destroyed part or all of a fixed network.

Cellular means operates within a standards compliant network.

Characteristic means the network quality experienced by a user, which can be affected by network load, congestion, latency, or capacity.

Destination ad hoc cellular base station means an ad hoc or fixed cellular base station that can receive a hand-in. A destination ad hoc cellular base station can be stationary or mobile.

Dynamic heterogeneous node means a node that is able to dynamically alter an operational mode or an operational parameter.

Environmental condition means radio frequency interference, temperature, precipitation, or other weather related metric.

EPC means an evolved packet core.

Fixed cellular base stations or fixed cellular nodes or fixed base stations are part of a fixed infrastructure. Their installation typically requires advanced planning, which means they are not ad hoc base stations or nodes.

Fixed cellular networks or fixed networks are comprised of fixed cellular base stations or fixed cellular nodes.

Heterogeneous means being diverse in character or content.

Heterogeneous network means a network that is diverse in at least one of the following operational modes: frequency, protocol, duplexing scheme, wired versus wireless connection, or licensed versus unlicensed spectrum Heterogeneous node means a node that can establish a heterogeneous network.

HSS means a home subscriber server.

Limited core network functionality means a processor having at least one of the following functionalities: paging, handover, authentication, location management, SGW selection, radio resource management, mobility management, roaming management, tracking area management, mobility anchor, lawful interception, policy enforcement, packet filtering, charging, or providing an anchor between 3GPP and non 3GPP technologies.

MME means mobility management entity.

Neighboring cellular base station could be a fixed base station or an ad hoc base station.

Operational parameter means radio frequency, mobility, network load, network configuration, access configuration, backhaul configuration, interference, or power level.

PGW means a packet data network gateway.

PCRF means a policy and charging rules function.

PDN means a packet data network.

SGW means a switching gateway.

Source ad hoc cellular base station means an ad hoc or fixed cellular base station from which a hand-off can be performed. A source ad hoc cellular base station can be stationary or mobile.

DETAILED DESCRIPTION

FIG. 1 shows an exemplary diagram of a prior art public safety communication network 100 that facilitates two types of communication—either through a tower 110 or peer-to-peer 120. In either of these communication modes, the public safety officer's radio must be within range of the tower 110, or of his peer 122. Being within range of a receiving radio or base station is an inherent limitation of all wireless communication networks. Some of the drawbacks of tower-based infrastructure are discussed in the background section.

In the public safety communication network 100, range problems are further compounded in the United States by the fact that most public safety communication networks 100 are owned and operated by individual towns, cities, municipalities, and the like. This results in a lack of uniformity nation-wide and an inability to leverage infrastructure from surrounding localities. Some of the public safety communications networks 100 in various countries are private networks, and some are run by commercial network operators, an example of one being Verizon or AT&T in the US. These communication networks 100 most typically support the use of land mobile radios, although some public safety networks 100 are capable of supporting smart phones used by public safety personnel.

In contrast to the prior art fixed infrastructure networks and the prior art of ad hoc military networks, the present invention is designed to utilize a mobile cellular base station to create an ad hoc cellular network as a stand-alone network or as a network that seamlessly integrates with existing cellular network infrastructure. Although this application uses the term "mobile" it will be understood by those skilled in the art that a mobile cellular base station may, at times, be mobile, and at other times may be stationary. The distinction between a "mobile cellular base station" as used in this application and a traditional stationary base station. Examples of stationary nodes are fixed tower base stations, fixed small cells, or a COW (cell on wheels). These types of base stations are not routinely moved, whereas the mobile cellular base stations described herein can be routinely moved. In terms of mobility, mobile cellular base stations could be carried by any number of moving entities such as: a vehicle, an airplane, a drone, a helicopter, a hot air balloon, a person, an animal, a boat, a snow mobile, a dirigible, a blimp, a train, a motorcycle, or a robot.

The process of creating, maintaining, or enhancing an ad hoc cellular network with a mobile cellular base station, alternatively called a mobile ad hoc cellular base station is challenging because mobile cellular base stations are not part of the fixed infra-structure. The fixed infrastructure makes many assumptions when operating that result from the base stations therein being pre-planned and fixed. The installation, operational parameters, antenna characteristics, interference patterns, access and backhaul configurations of ad hoc cellular base stations are not preplanned. An ad hoc cellular base stations can change their location at any time.

Adding a ad hoc cellular base station to an existing cellular network in a way that enhances overall network capability requires considering which access and backhaul configurations should be offered, what the transmission power of the mobile ad hoc cellular base station should be, how the fixed cellular network should respond, and in some instances, deciding whether to include limited core network functionality within the mobile ad hoc cellular base stations so that they can perform some of the functions of the core network operational devices. In LTE for example, a core network operational device could be an EPC. If a mobile ad hoc cellular base station did include limited core network functionality within its processor, for an LTE network, these functionalities would include: the HSS, the SGW, the PGW, or the MME. Those of skill in the art will recognize that these functionalities may be assumed by different entities within different networks outside of an LTE network. Embodiments of the limited core network functionality could therefore be adapted to meet the functionalities of these additional networks.

One of the novel aspects of the methods described herein is, they take these issues into consideration before and during the establishment of an ad hoc cellular network. Another point of novelty in the methods disclosed herein is the fact that they are executed on multi-RAT nodes. Because the nodes have multiple access and backhaul radios built-in, the choice of which access or which backhaul configuration to adopt is fluid and can be determined by the network conditions in real-time.

In addition, the multi-RAT nodes work cooperatively in some embodiments with a computing cloud component. The computing cloud component is able to bring a "God's view," that is a high level management perspective, to the ad hoc cellular network. Some of the network management intelligence resident in the computing cloud is also resident in processors of the multi-RAT nodes. Accordingly, either of these computer mediums can make decisions about access or backhaul configurations, choosing different frequency bands, such as, but not restricted to, 2G, 3G, 4G, LTE, Wi-Fi, high speed Wi-Fi, TV white space, satellite, Bluetooth, ZigBee, licensed or unlicensed spectrum, wired or wireless connectivity, and the like, different communication protocols, duplexing schemes e.g., FDD, TDD, Full Duplex and the like, as well as transmit power levels, antenna orientations, and in the case of phased array antennas, transmission power characteristics.

In addition, ad hoc cellular base stations as described herein are able to provide multimedia services, not just voice, data or Internet services. The intelligence that is imbued to the ad hoc cellular networks facilitates data prioritization, that is prioritizing data for first responders in a public safety environment while additionally allowing simultaneous lower priority users to access additional network bandwidth if available. Priority can mean capacity guarantees, decisions regarding resolution of image, audio, video transmissions, or data download speeds. These management decisions can be applied to both access and backhaul configurations.

Access and backhaul configurations can further utilize encryption to provide secure data transmissions. Moreover, secured authorizations similar to those used by VPN can be implemented. Ad hoc cellular base stations executing the methods described herein have a memory within their architecture. As such, they are able to cache data packets. If there is a path failure, these cached data packets can be retransmitted. In addition, authentication credentials can be cached. These too can be used to reauthenticate in the event of a path loss or a network failure.

Figure 2:
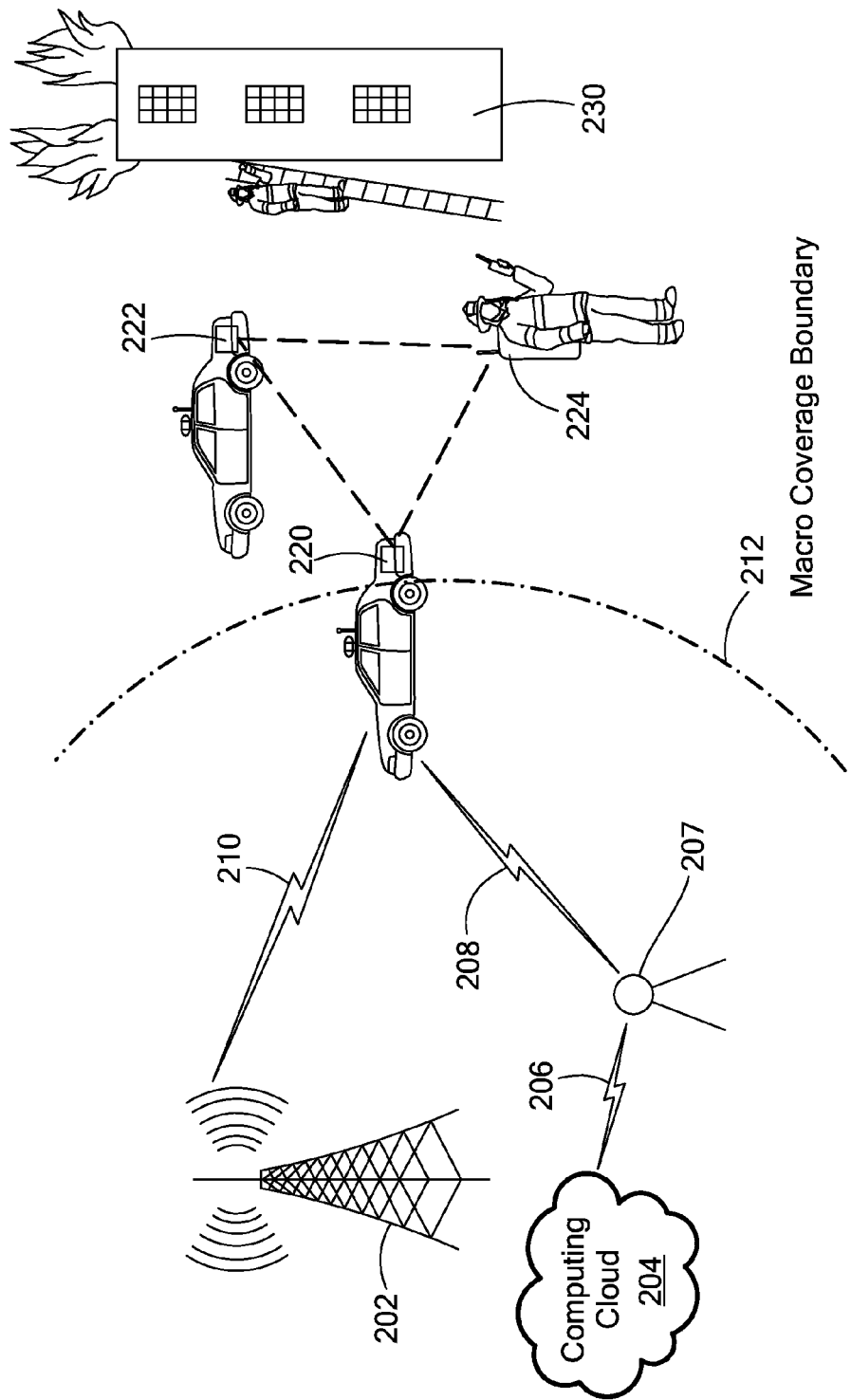
FIG. 2 is an architectural rendering of a cellular communication network upon which methods of the present invention could be executed.

FIG. 2 shows an architectural rendering upon which the methods of the present invention could be executed. This diagram is merely exemplary and is not intended to be limiting with respect to the type or number of hardware elements. Similarly, although FIG. 2 shows a public safety communication scenario, the teachings of this application are not limited to the public safety sector. Those of skill in the art will recognize its applicability to myriad communication networks, including without limitation, people working in an oil field, a mine, on a military base, a news crew covering local events, at an airport, at a seaport, for a support crew that needs to provide lots of bandwidth and improve cell efficiency, in rural locations, and the like. The applicability of the embodiments disclosed herein therefor apply to military, consumer, business, and public safety networks.

The embodiments described herein enhance network coverage by creating and maintaining an ad hoc cellular network, or extending the range of a fixed network. They also create a multi-dimensional heterogeneous networks having redundancy and autonomy. When the ad hoc cellular base stations utilizing embodiments discussed herein establishes or enhances a fixed cellular network, it they so by seamlessly integrating into the fixed network topology. If there is an existing fixed network, the methods disclosed herein provide a means of automating the integration of the ad hoc cellular into an existing fixed network. This is currently done by humans as part of network planning and implementation. The overall orchestration of adding to an existing fixed network, both from the standpoint of connecting the two networks, and from the standpoint of managing the combined networks is a labor intensive process that is automated by the method embodiments of this invention.

These embodiments could be executed and run on networks having a topology similar to that depicted in FIG. 2 or on any wireless communication network incorporating an ad hoc cellular base station node into the network, whether that base station is still moving or it has become stationary.

Assume that FIG. 2 depicts an emergency scene where first responders have been called to the scene of a building 230 fire. In terms of the wireless network capabilities near the burning building 230, there is a macro tower 202 providing cellular service to land-mobile radios for public safety individuals via a backhaul connection 210 from the macro tower 202 to an ad hoc cellular base station 220. A secondary backhaul connection 208 could also be established between ad hoc cellular base station 220 and a fixed base station 207. In this architecture, the fixed base station 207 could be a fixed base station or an ad hoc cellular base station. The fixed base station 207 could be communicatively coupled to a computing cloud component 204 via backhaul connection 206.

Additional variations of this topology include additional ad hoc nodes 222 and 224, the absence of the fixed node 207 and/or the absence of macro tower 202. In addition, although FIG. 2 shows three ad hoc cellular base stations 220, 222, and 224, the methods of this invention can be executed on a single ad hoc cellular base station. The computing cloud component 204 could be an external server as pictured in FIG. 2, as well as an internal processor located within an ad hoc cellular base station 220. Some of the embodiments discussed herein could be executed on an external computing cloud component 204 or on an internal processor, as will be described below.

Assume for purposes of this example that the fire fighters and police officers share the macro tower 202, either by sharing a base station mounted on the tower or by mounting two independent base stations, one providing coverage to the fire fighters and one providing coverage to the police officers. When the first responders arrive at the scene they notice that the macro coverage boundary 212 does not reach inside of the burning building 230. This means, once they are inside of the building 230, they will not have external cellular network connectivity. If their radios do not have applications that allow them to function in peer-to-peer mode or if those radios do not have transmit and receive capabilities that would work anywhere in the building, the first responders will not be able to communicate with one another.

When the ad hoc cellular base station 220 is en route to the burning building 230, it could have a backhaul configurations, such as LTE or Wi-Fi, which would allow it to provide an access signal having for example Wi-Fi as the access configuration to individuals within the vehicle containing the ad hoc cellular base station 220. Applicants note that the methods described herein could be executed on a computer readable medium located within the ad hoc cellular base station 220, on another device in the exiting wireless network, on a computing cloud component 204, or on a fixed base station 207.

Figure 3:
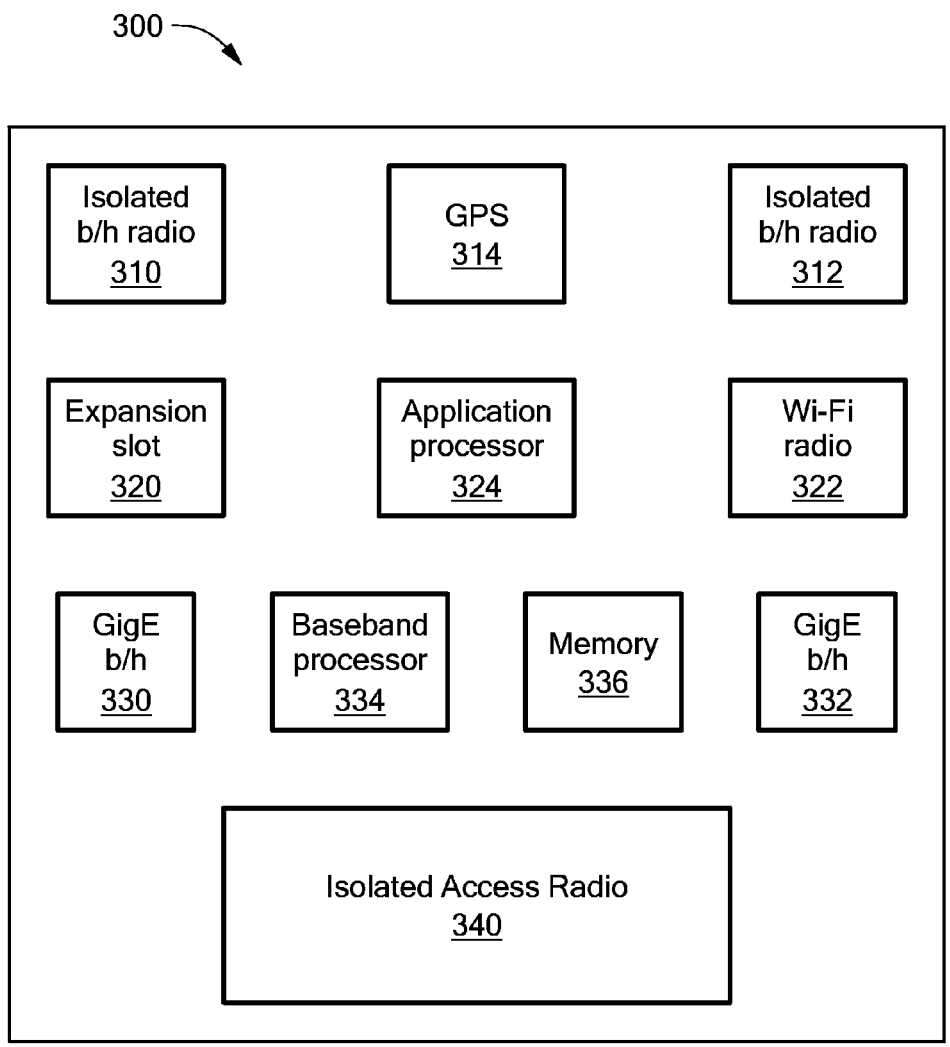
FIG. 3 is an architectural rendering of an ad hoc cellular base station upon which methods of the present invention can be executed.

FIG. 3 shows an architectural diagram of an ad hoc cellular base station 300 having a computer readable medium therein where method embodiments can be stored and executed on the hardware depicted therein. For ease of explanation, we refer to an ad hoc cellular base station 300 when discussing the architecture of FIG. 3 with the understanding that similar architecture could be present in a fixed base station 207. And the method embodiments discussed herein could likewise be executed on either an ad hoc cellular base station 300 or a fixed base station 207.

Referring to FIG. 3, the ad hoc base station 300 depicted therein includes two isolated backhaul radios 310, 312, a GPS receiver coupled to a GPS antenna, "GPS" 314, a Wi-Fi radio 322, an application processor 324, a baseband processor 334, a memory 336, two additional backhaul radios 330, 332, which in one embodiment could be a 10 Gigabit Ethernet backhaul, an expansion slot 320, and isolated access radios 340. Limited core network functionality could be stored within the application processor 324. As previously discussed, isolated backhaul radios 310, 312 and isolated access radios 340 could be hardware configured to transmit within at least one of the following: 2G, 3G, 4G, LTE, Wi-Fi, high speed Wi-Fi, TV white space, satellite, Bluetooth, ZigBee, FDD, TDD, full duplex, wired or wireless backhaul, and licensed and unlicensed spectrum.

In some embodiments and without limitation, hardware configurations could be as follows. At least one access radio 340 could be a 20 MHz 2×2 MIMO LTE radio transmitting at 1 W of power. A second access radio 340 could be a Wi-Fi access radio, 3×3 MIMO WPA 2 Enterprise. One of the backhaul radios 310 could be a multi radio mesh, up to 3×3 MIMO, 40 MHz wide, and WPA 2 enterprise grade encryption, another example of a backhaul radio could be cellular backhaul radios. The ad hoc cellular base station 300 could also include connectors for long haul link support and antennas. In some embodiments antennas could be high gain/narrow beam or omni/sectored antenna, or omni antennas. Moreover, the hardware depicted in FIG. 3 is tunable, and, therefore capable of transmitting and receiving on numerous frequencies. The application processor 324 is capable of hosting limited core functionality and application servers. In embodiments described herein the ad hoc mobile cellular base station could be in a vehicle, an airplane, a drone, a helicopter, a hot air balloon, a train, a motorcycle, a snow mobile, a robot, on a person, on an animal, or any entity that is capable of motion.

The limited core network functionality could include at least one of the following network operation functions: paging, handover, authentication, location management, SGW selection, radio resource management, mobility management, roaming management, tracking area management, mobility anchor, lawful interception, policy enforcement, packet filtering, charging, or providing an anchor between 3GPP and non 3GPP technologies.

Figure 4:
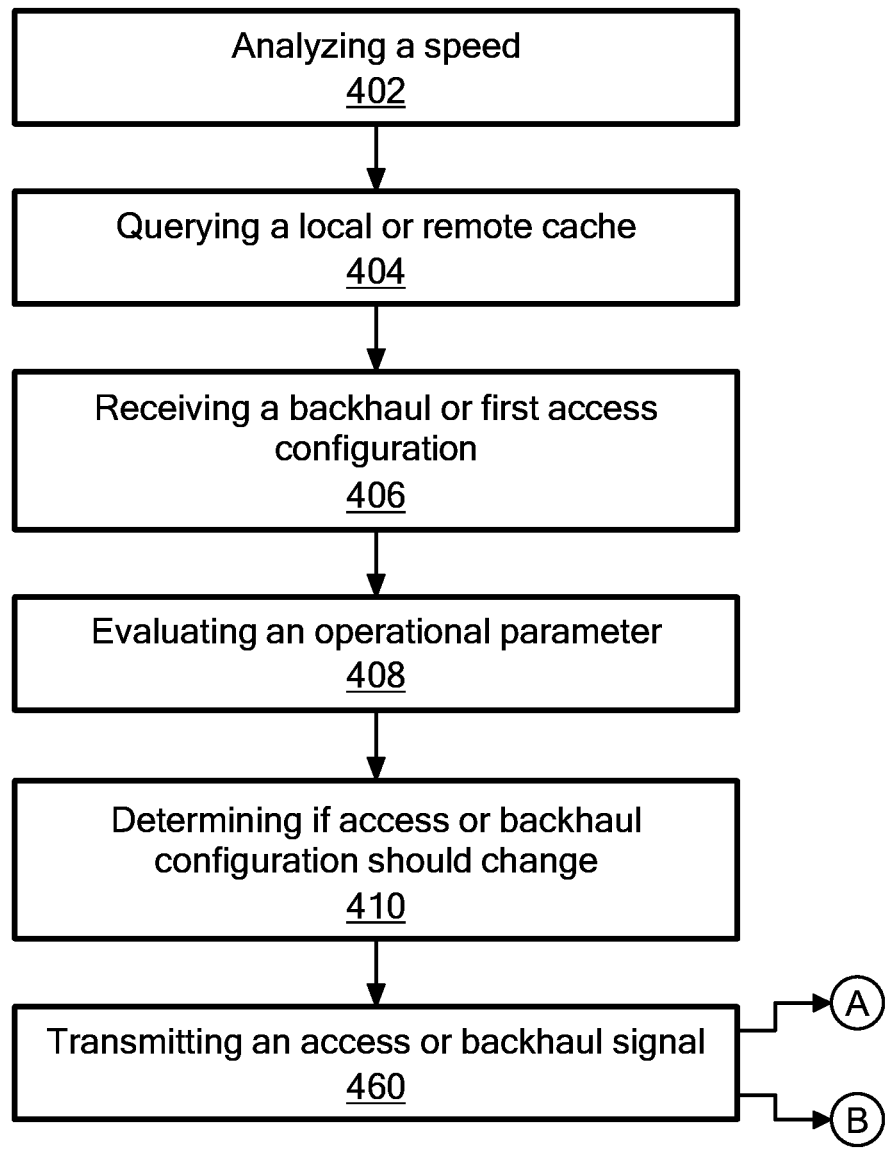
FIG. 4 shows the steps of embodiments of methods for establishing an ad hoc cellular network or integrating an ad hoc cellular network into a fixed cellular network.
Figure 4:
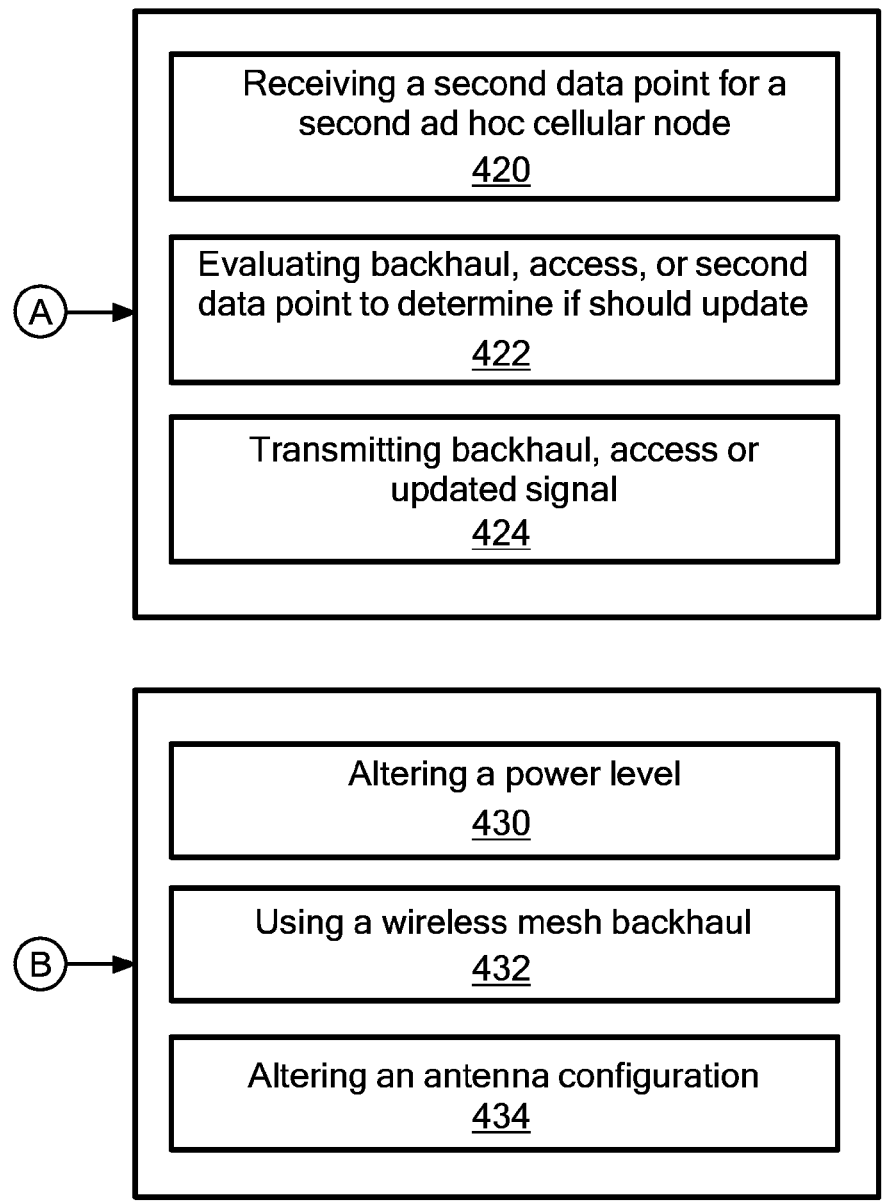

FIG. 4 depicts a method of establishing an ad hoc cellular network having an ad hoc cellular base station or integrating an ad hoc cellular base station into a fixed cellular network In one embodiment, these method steps could be stored on a computer readable medium either in an ad hoc cellular base station 300 or in a computer readable medium that is accessible to an ad hoc cellular base station, such as a computing cloud component 204.

In the method of this embodiment, the first step could be analyzing 402 a speed of the ad hoc cellular base station 300. This analysis could be performed by using a velocity measurement obtained from GPS 314, by using location data or direction data of the ad hoc cellular base station 300 as a function of time, to determine if the ad hoc cellular base station 300 has become stationary. Once the ad hoc cellular base station 300 becomes stationary, the computer readable medium in a processor 324 could query 404 a local or remote cache to determine an access configuration or a first backhaul configuration to be used by the ad hoc cellular base station 300.

As discussed, the access configuration or backhaul configuration could be at least one of the following: 2G, 3G, 4G, LTE, Wi-Fi, high speed Wi-Fi, TV white space, satellite, Bluetooth, ZigBee, FDD, TDD, full duplex, wired or wireless backhaul, and licensed and unlicensed spectrum. In some embodiments, the choice of which access configuration or backhaul configuration could be related to an available power source for the ad hoc cellular base station 300. For example, if the ad hoc cellular base station 300 is connected to a car battery, it likely has more transmit and receive power than if it is connected to a battery cell. The amount of available power, limited by battery life, could be a factor used to determine which access or backhaul configuration should be used. Moreover, this decision could be made dynamically because available power may change.

After querying the local or remote cache, the processor 324 could receive 406 an access configuration or a backhaul configuration. The processor 324 may then evaluate 408 an operational parameter and determine 410 if the access configuration or the backhaul configuration should be updated. Once a final access configuration or backhaul configuration is chosen, the ad hoc cellular node 300 could transmit 460 an access signal or a backhaul signal.

In an alternate embodiment, the access configuration and the backhaul configuration could be within the same frequency and band or exactly the same frequency and band, e.g., LTE Band 14 used for access and backhaul. In another alternate embodiment, the access configuration or the backhaul configuration could be full duplex. In a variation of this embodiment, a second ad hoc cellular base station could be added to the ad hoc cellular network. In this embodiment, the ad hoc cellular base station could establish a second backhaul connection between itself and the second ad hoc cellular base station. This second backhaul link could have a cellular or mesh protocol.

In an additional embodiment, the access or backhaul configuration could be determined based on an operational parameter. In yet another embodiment, the ad hoc cellular base station could authenticate a user equipment within the ad hoc cellular network by using information from an already authenticated user concerning additional users within the ad hoc cellular network. This already authenticated user may, for example, have identifying information about other users within the ad hoc cellular network.

Referring again to FIG. 4, in an alternate embodiment after transmitting 460 an access or a backhaul signal, the ad hoc cellular base station could receive 420 a second location, a second mobility state, or a second travel direction for a second ad hoc cellular base station. Once the processor receives 420 this information, it can evaluate 422 the backhaul configuration, the access configuration, the second location, the second mobility state, or the second travel direction to determine if either the backhaul configuration or the access configuration should be updated. After making this assessment, the ad hoc cellular node 300 could transmit 424 an access or a backhaul signal using the access or backhaul configuration or the updated access or backhaul configuration.

In an alternate embodiment, after transmitting 460 the access signal or the backhaul signal, the ad hoc cellular base station could alter 430 a power level of one of its access radios or one of its backhaul radios. It could then use 432 a wireless mesh backhaul connection within the ad hoc cellular network. The ad hoc cellular node could then alter 434 an antenna configuration so as to more optimally transmit upon a particular access configuration or a backhaul configuration.

In the situation where the ad hoc cellular base station is transitioning from a mobile state to a stationary state, it may have to readjust some of the operational parameters of its radio access or backhaul hardware. In that instance, the ad hoc cellular base station 300 may alter 430 a power level of an access or a backhaul radio in order to transmit or receive over the access or backhaul configuration. In some embodiments, ad hoc cellular base stations 300 are equipped with a plurality of antennas chosen to support the access and backhaul configurations for that particular ad hoc cellular base station 300. When establishing an ad hoc cellular network, the ad hoc cellular base station 300 could also alter 434 an antenna configuration, such as directionality, gain, frequency characteristics, and the like.

In an additional embodiment, the ad hoc cellular base station 300 could use query a local or remote cache to cross correlate a first access configuration with a first location. After comparing the two, the ad hoc cellular base station could choose an updated first access configuration based upon information retrieved during its query. For example, the ad hoc cellular base station could use geographic information to determine which service providers have the best coverage for that area. It could, in that instance choose an access or a backhaul configuration based on this criterion. Similarly, a TV white space backhaul frequency could be chosen based on availability of spectrum in the particular geographic location. In an alternate embodiment, the ad hoc cellular base station may query the local or remote cache to discern whether other base stations are operating within its proximity and if so, it could adjust its power level so as to minimize interference.

Referring again to FIG. 4, after the ad hoc cellular base station transmits 460 an access signal or a backhaul signal, it could communicate a decision to hand-off a data or voice session of a user from a source ad hoc cellular base station to a destination cellular base station. The source ad hoc cellular base station could be the ad hoc cellular base station 300 and the destination cellular base station could be a second ad hoc cellular base station or a fixed base station. Once this decision is made, the source ad hoc cellular base station and the destination cellular base station could exchange handover messaging so as to effectuate the hand-over. In a similar embodiment, a hand-in could be performed from a source cellular base station to a destination ad hoc cellular base station. In this embodiment, the source cellular base station and the destination ad hoc cellular base station could exchange hand-in messaging information so as to effectuate the hand-in. In yet an additional embodiment, the hand-off messaging or the hand-in messaging could further be exchanged with a core network.

In yet an additional embodiment, the ad hoc cellular base station 300 could detect a coverage gap within the ad hoc cellular network. After detecting this coverage gap, it could establish at least one wireless backhaul connection to a core network using one of its antennas having a gain of greater than 0 dB. Once this backhaul connection is established, the ad hoc cellular base station 300 could use the access configuration to transmit or receive signals on one of its access radios.

Figure 5A:
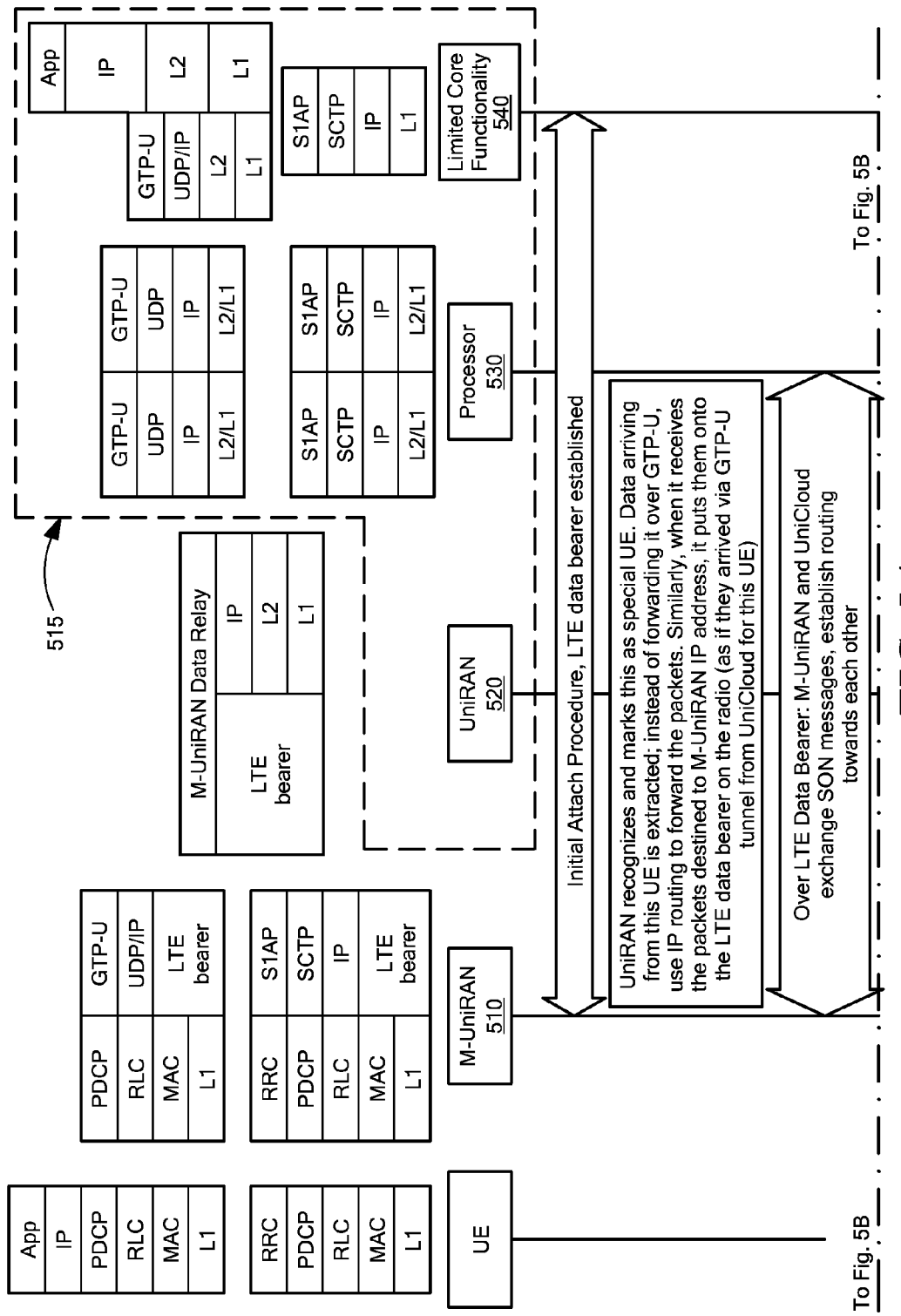
FIG. 5A shows a first portion of a message flow for establishing a wireless backhaul connection in an ad hoc cellular network.
Figure 5B:
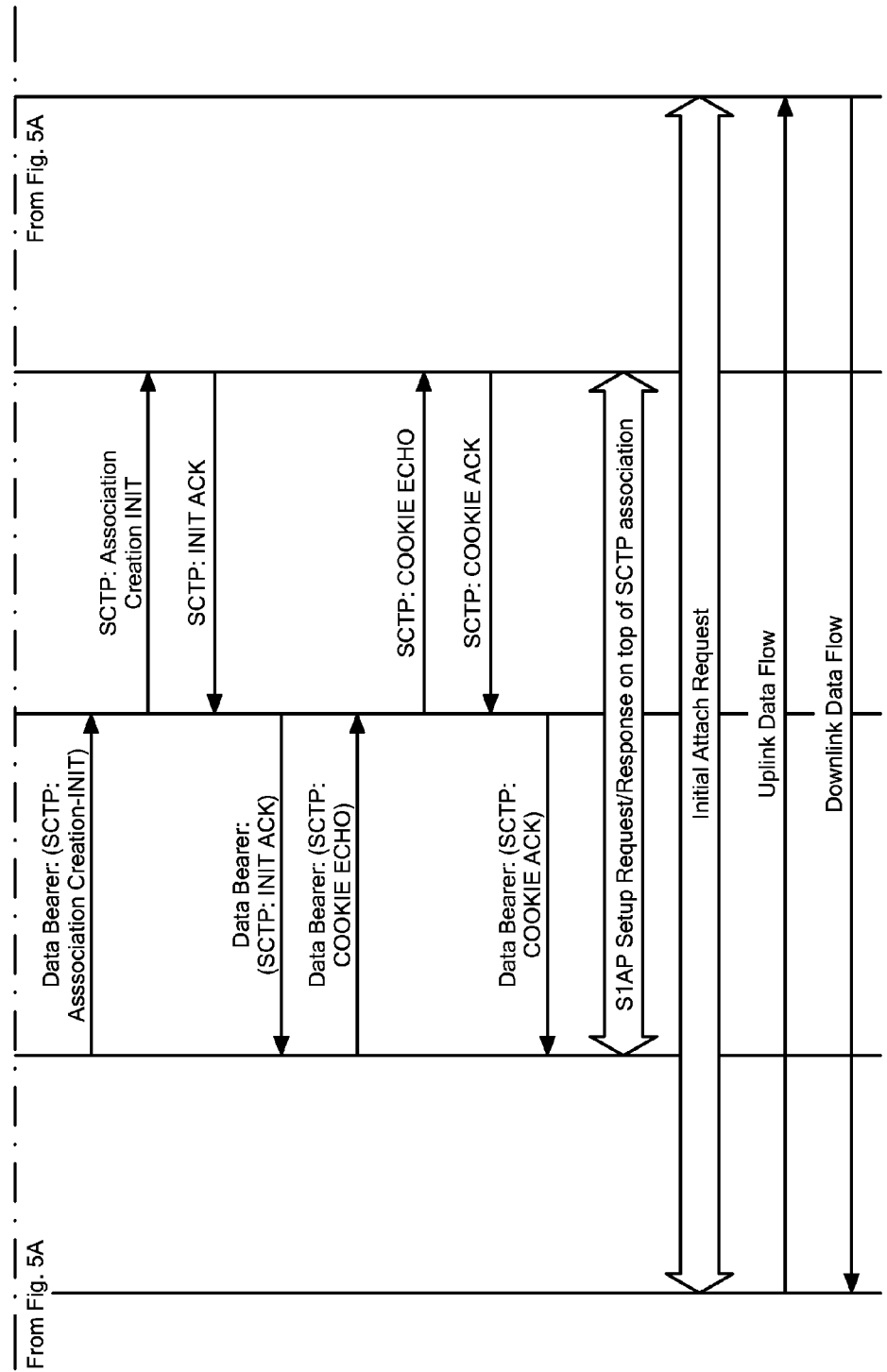
FIG. 5B shows a second portion of the message flow for establishing a wireless backhaul connection in an ad hoc cellular network.

In an alternate embodiment, the ad hoc cellular base station 300 could establish a wireless backhaul link. A message flow for this embodiment is shown in FIG. 5. As can be seen in FIG. 5, in this embodiment a first ad hoc cellular base station 510 is communicatively coupled to a second ad hoc cellular base station 515. In addition to the architecture components inherent in an ad hoc cellular base station 300, the second ad hoc cellular base station 515 has an internal processor 530 having limited core functionality 540 stored thereon.

Figure 6:
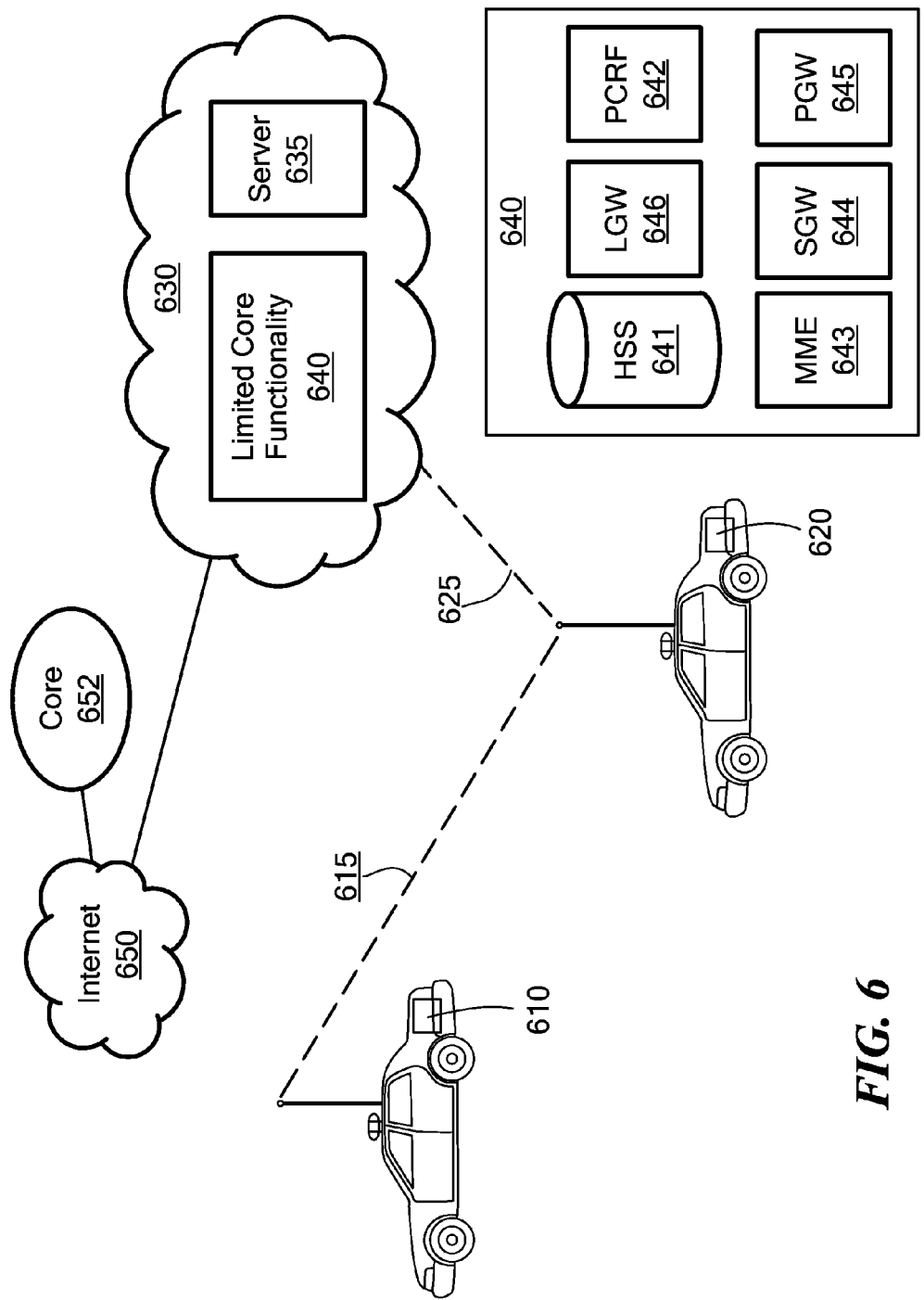
FIG. 6 is an illustration an architectural set-up upon which methods for establishing an ad hoc cellular network or integrating an ad hoc cellular network into a fixed cellular network could be performed

FIG. 6 shows an ad hoc cellular network that could be used as an architectural basis for performing embodiments described with reference to FIG. 7. Referring to FIG. 6, this ad hoc cellular network can provide local wireless access service to users within range of the ad hoc cellular network. In this ad hoc cellular network, there is a first ad hoc cellular base station 610 and a second ad hoc cellular base station 620. The first ad hoc cellular base station 610 and the second ad hoc cellular base station 620 have a wireless backhaul connection 615. The second ad hoc cellular base station 620 can optionally be to a computing cloud 630 via backhaul connection 625. The computing could 630 contain a server 635 and a limited core network functionality processor 640. The limited core network functionality processor 640 has some or all of the functionality provided by a core EPC, namely functionality typically performed by an HSS 641, a PCRF 642, an MME 643, an SGW 644, an LGW 646, or a PGW 645. The computing cloud 630 is also communicatively coupled to the Internet 650 or in some embodiments to the core network 652. In an alternate embodiment, the limited core functionality processor 640 can be within the second ad hoc cellular base station 620. In one embodiment, the first 610 and second cellular base stations 620 have antennas having higher gain that the average gain in a cellular telephone, also called user equipment.

In some embodiments at least one ad hoc cellular base station 620 can localize the functionality of the PGW 645 by creating a local PGW or LGW 646. If user equipment being serviced by the ad hoc cellular base station 620 creates a specific packet data network that is Local IP Access enable, LGW 646 could act as a packet data network gateway by handling the signaling to create a PDN connection. The packet data network, in this embodiment, would be anchored on LGW 646. In this embodiment, LGW 646 could allocate IP address to user equipment within the network. LGW 646 would also anchor these IP addresses. When the uplink data traffic is received by the ad hoc cellular base station 620, it could, using internal processors, route this traffic using LGW 646 functionality. LGW 646 functionality has the advantage of optimizing traffic paths and thereby reducing network overhead. One way this is accomplished is, for example, if an ad hoc cellular base station 620 receives data for more than one user equipment that it is servicing, LGW 646 can route the traffic between these two device internally within the ad hoc cellular network rather than through any other network elements. In this way, LGW 646 can create a peer-to-peer communication network between these two user equipments. In some embodiments, traffic optimization done by LGW 646 can improve data throughput by removing and caching a protocol header that is typically passed on by existing unintelligent fixed cellular nodes. The choice of which ad hoc cellular base station 610 or 620 is arbitrary and in subsequent embodiments, the architecture described with respect to the second ad hoc cellular base station 620 could be resident on the first ad hoc cellular base station 610 and vice versa.

Figure 7:
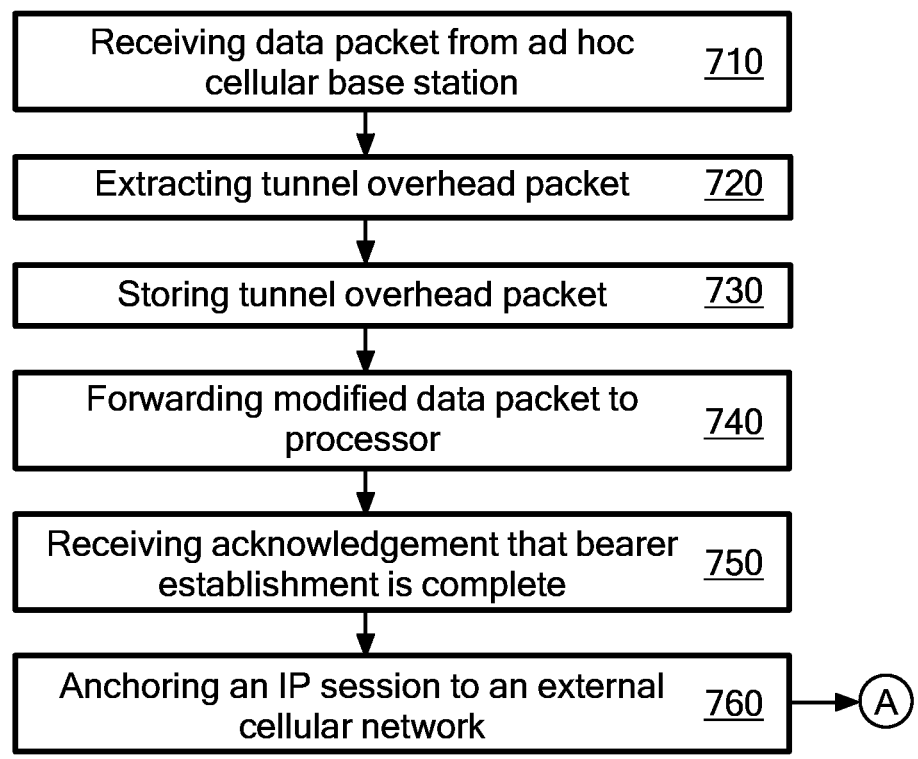
FIG. 7 shows steps of methods for establishing a wireless backhaul connection for an ad hoc cellular base station.
Figure 7:
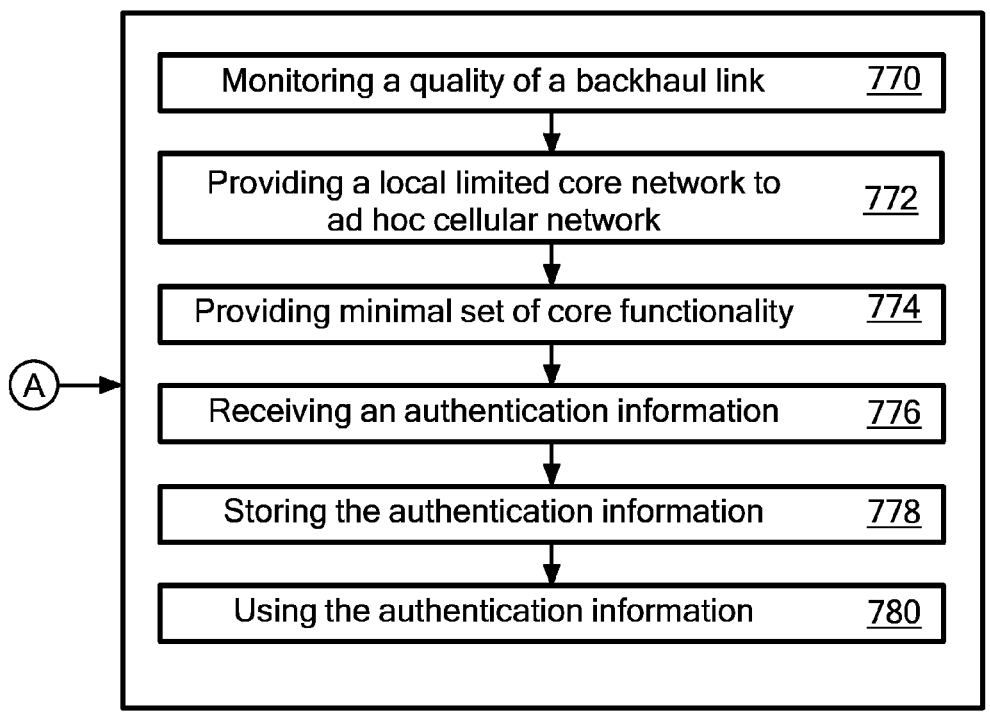

The steps of this embodiment, shown in FIG. 7, are performed by the second ad hoc cellular base station 620. Turning to FIG. 7, the second ad hoc cellular base station 620 receives 710 a data packet from the first ad hoc cellular base station 610. Rather than forwarding the data packet over a GTP-U tunnel, the second ad hoc cellular base station 620 extracts 720 a tunnel overhead packet from the data packet, thereby creating a modified data packet. The second ad hoc cellular base station 620 then stores 730 the tunnel overhead packet. It then forwards 740 the modified data packet to the processor 640, the processor in one embodiment being located within the second ad hoc cellular base station 620. In an alternate embodiment, the processor 640 could be located in a computing cloud component 630. The processor 640, in conjunction with its limited core functionality, establish a bearer for messaging. The first ad hoc cellular base station 610 then receives 750 from the second ad hoc cellular base station 620, an acknowledgement that bearer establishment is complete. Lastly, the second ad hoc cellular base station 620 anchors 760 an IP session to an external cellular network.

In an alternate embodiment of this method, the data packet could be an initial attach request. In yet an additional alternate embodiment, the modified data packet could be forwarded to the EPC. These embodiments have the advantage of eliminating tunnel overhead by extracting packets from mobile nodes. In yet another embodiment of this method, the ad hoc cellular network could provide situational awareness to a user within that network via either the first or second cellular base stations. Examples of situational awareness include without limitation: a location of an ad hoc cellular base station, a direction or travel of an ad hoc cellular base station, a mobility parameter for an ad hoc cellular base station, an environmental parameter for an ad hoc cellular base station, a coverage map of an ad-hoc cellular base station, an environmental parameter of a fixed base station, an operational parameter of a fixed base station, a location of a fixed base station, or a location of a user.

Turning again to FIG. 7, in a further method beginning after the anchoring 760 has transpired, it is possible to monitor 770 the quality of a backhaul connection to the core network to determine if it falls below a threshold parameter. Threshold parameters could be measured by measuring a received signal strength indicator ("RSSI"). An additional example of a threshold parameter is set forth in the 3GPP standard 36.104, the contents of which are hereby incorporated by reference. The threshold parameters according to that standard appear in the table 6.2-1 of that standard, reprinted below. In this embodiment, the local area base station quality thresholds apply.

| BS class | PRAT |
|---|---|
| Wide Area BS | — (note) |
| Local Area BS | ≤+24 dBm (for one transmit antenna port) |
| | ≤+21 dBm (for two transmit antenna ports) |
| | ≤+18 dBm (for four transmit antenna ports) |
| Home BS | ≤+20 dBm (for one transmit antenna port) |
| | ≤+17 dBm (for two transmit antenna ports) |
| | ≤+14 dBm (for four transmit antenna ports) |

NOTE:
There is no upper limit for the rated output power of the Wide Area Base Station.

Additional examples of threshold parameters are data rate, interference, network load, congestion, and latency.

Referring again to FIG. 7, once the quality of the backhaul connection has fallen below a threshold parameter, the first 610 or second ad hoc cellular 620 base station could provide 772 a local limited core network to users within the ad hoc cellular network. In order to provide 772 this local limited network, the first 610 or second ad hoc cellular base station 620 could provide a minimal set of core network functionality to user equipment within the limited core network. A next step in providing 774 local limited core network would be to authenticate users thereon by receiving 776 authentication information from the core network. Examples of authentication information could be SSID, IMEI, and the like. This authentication information could be stored 778 in a memory and used 780 to authenticate any users on the local limited core network.

In an alternate embodiment of this method, the ad hoc cellular network could be managed for example by an external computing cloud component, or by either the first ad hoc cellular base station or the second ad hoc cellular base station. Management could include making decisions about power levels, the ad hoc cellular base stations could also include a voice-over-IP applications including without limitation: push-to-talk, peer-to-peer communication, an ad hoc user nationwide dialing plan; an ad hoc user international dialing plan, conference calling, or a speed dial list. The national or international dialing plans could be similar to the E 164 standard dialing plan. In this embodiment, the voice application server could enable national or international calls between first responders in disparate locations. For example, a bridge application server could bridge standard E 164 telephony users to emergency users and vice versa. These embodiments could be implemented in closed ad hoc networks of the present invention or in ad hoc cellular networks integrated into fixed cellular networks.

In an alternate embodiment of these methods, there could be a third ad hoc cellular base station that come within range of the local limited core network. In this embodiment, the first or second ad hoc cellular base station could detect the presence of this third ad hoc cellular base station. In this embodiment, the third ad hoc cellular base station could also have a processor having limited core functionality stored thereon. The first and or second ad hoc cellular base station could use a wired or wireless backhaul connection to integrate the third ad hoc cellular base station into the local limited core network. This integration could transpire via exchanging messaging information between the ad hoc cellular nodes. This messaging information could include network operational parameters such as power output, access and backhaul configurations, routing tables, user authentication information, antenna transmission characteristics, and the like.

In an alternate embodiment of these methods, it may be the case that the quality of the backhaul connection to the core network is restored above a threshold parameter. In that case, this embodiment could synchronize the authentication information it has stored in local memory with an HSS or other core network device providing authentication for core network users.

Figure 8:
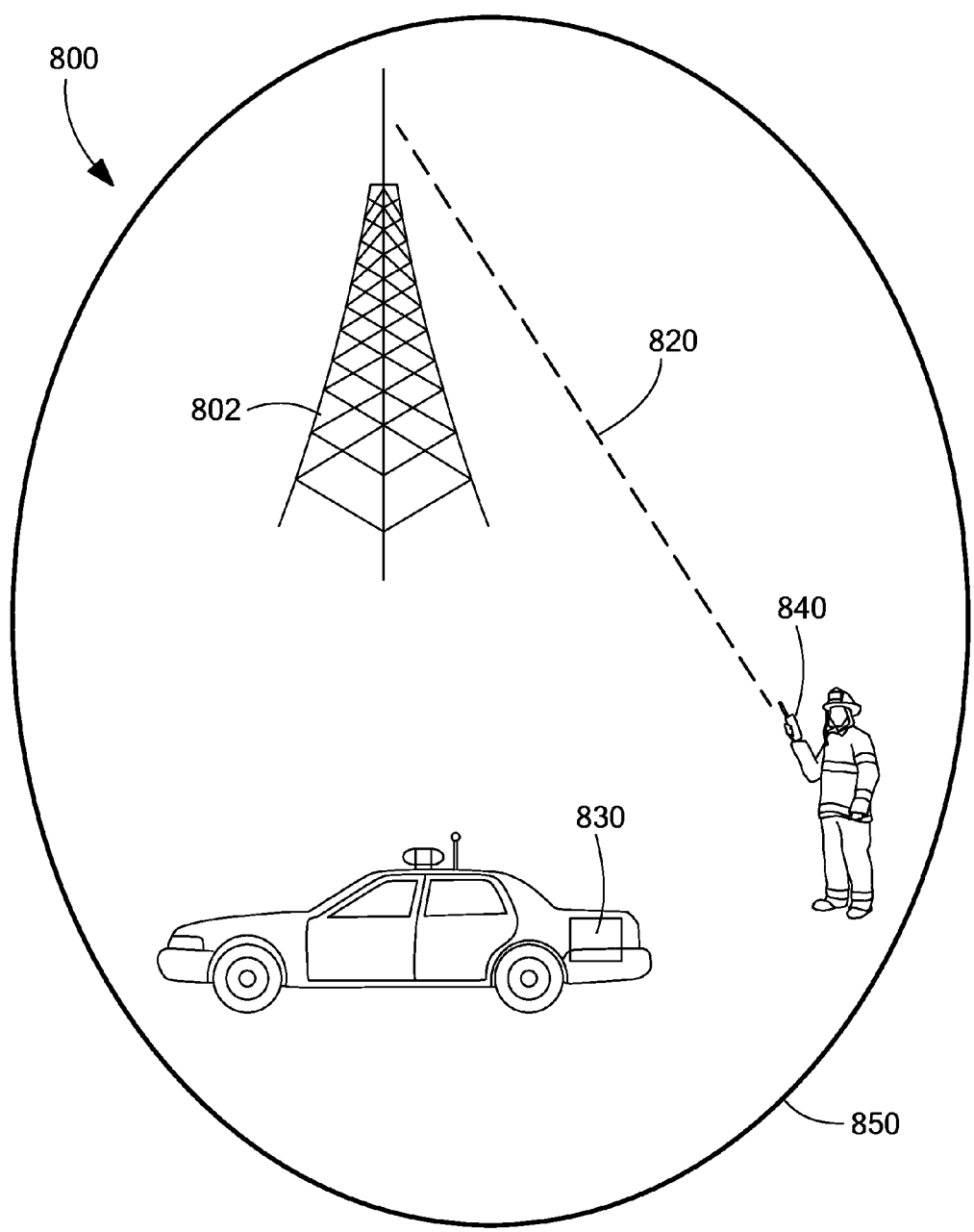
FIG. 8 shows an architecture upon which methods of determining if an ad hoc cellular base station should establish an ad hoc cellular network or enhance the coverage of a fixed cellular network could be performed.

In some situations it may be advantageous when an ad hoc cellular base station arrives at a location to determine if there is a fixed cellular adequately supporting users within range. In this instance, the ad hoc cellular base station may forego establishing an ad hoc cellular network until a user within the existing network needs enhanced coverage. FIG. 8 shows an architectural example of when this might occur. In FIG. 8, an ad hoc cellular base station 830 may have just arrived at its present location. When it arrives, it can activate internal receivers to assess the network coverage area 850. The ad hoc cellular base station 830 can listen to transmissions from the user equipment 840 to the tower 802. In one embodiment, the ad hoc cellular base station 830 can transmit and receive signals as though it were another user equipment within the network coverage area 850. By configuring its messaging to appear as though it is another user equipment, it is able to obtain characteristics and operational parameters over control channels about other user equipment within the network coverage area 850. Examples of characteristics are: the location of the other user equipment 840, the perimeter of the network coverage area 850, the proximity of the user equipment 840 to the perimeter of the network coverage area 850. Examples of operational parameters are: interference characteristics, the existence of know "not spots," channel availability, detecting if the user equipment 840 has sent a message to the tower 802 indicating that it requires more bandwidth, the user equipment's current data rate, the existence of other base stations within range of the tower 802 or the ad hoc cellular base station 830 and whether the tower 802 has granted or denied a request for bandwidth. In these scenarios, the ad hoc cellular base station 802 could determine that it would be advantageous for it to enhance the existing network coverage zone by providing an access signal for the user equipment 840.

Figure 9:
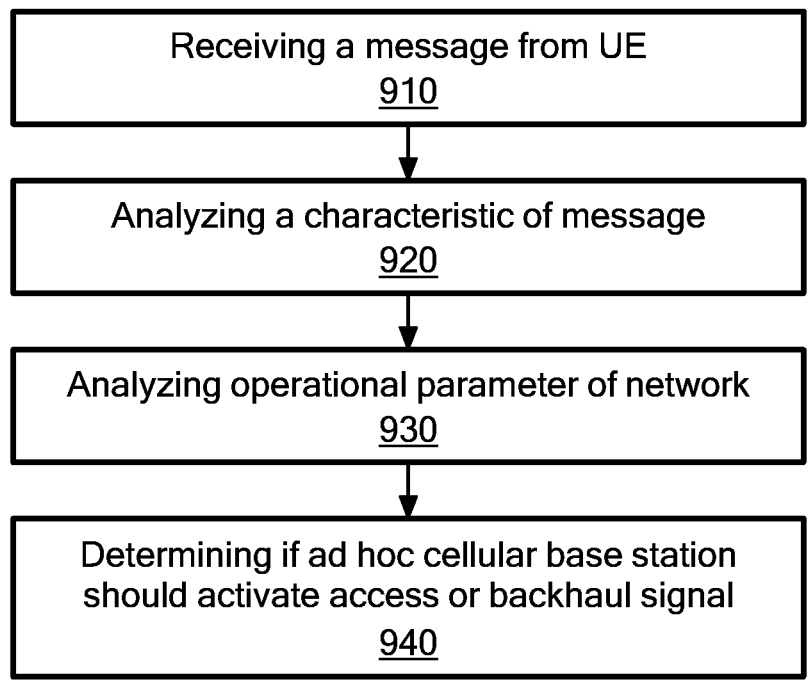
FIG. 9 depicts steps for methods of determining if an ad hoc cellular base station should enable, disable, or modify an access signal or a backhaul signal.

FIG. 9 shows the steps of a method that allows an ad hoc cellular base station 830 to enhance network coverage as needed. In this embodiment, the ad hoc cellular base station 830 receives 910 a message sent from a user equipment operating within an existing network coverage area, wherein the message is sent over a control channel or a bearer channel. The ad hoc cellular base station 830 then analyzes 920 a characteristic of the message and it analyzes 930 an operational parameter of the existing cellular network 850. Based on these analyses, the ad hoc cellular base station 830 determines 940 if it should enable, disable, or modify an existing access signal or an existing backhaul signal based on the characteristic of the message or the operational parameter.

Figure 10:
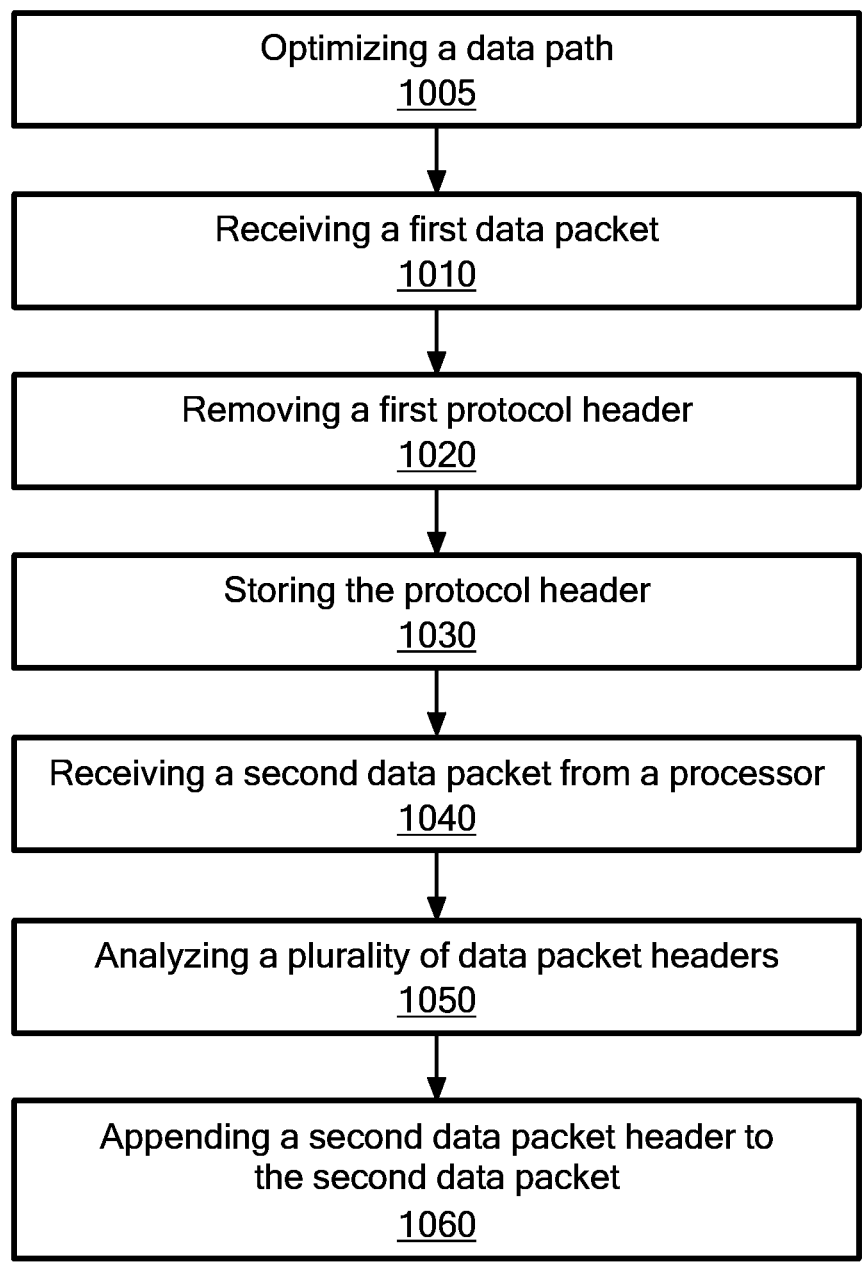
FIG. 10 shows steps for methods of optimizing a data path by providing a local gateway.

In an alternate embodiment, it may be advantageous to in the context of an ad hoc cellular network for one ad hoc cellular base station to act as a local gateway. The steps of this embodiment are described with reference to FIG. 10. In this embodiment, a first ad hoc cellular base station 610, which is providing local wireless access, could optimize 1005 a data path by receiving 1010 a first data packet from a user equipment. The first ad hoc cellular base station 610, which has a local gateway 646 providing local wireless access, could remove 1020 a first protocol header from the data packet and store 1030 the first protocol header in a memory. The first ad hoc cellular base station 610 could receive 1040 a second data packet from a second ad hoc cellular base station 620 having a processor 640 with limited core network functionality stored thereon. This second data packet may not have a second protocol header attached thereto. Accordingly, the first ad hoc cellular base station 610 could analyze 1050 a plurality of data packet headers stored in memory in order to determine which one corresponds to the second data packet. After finding the right data packet header, the first ad hoc cellular base station 610 could append the correct data packet header to the second data packet.

Figure 11:
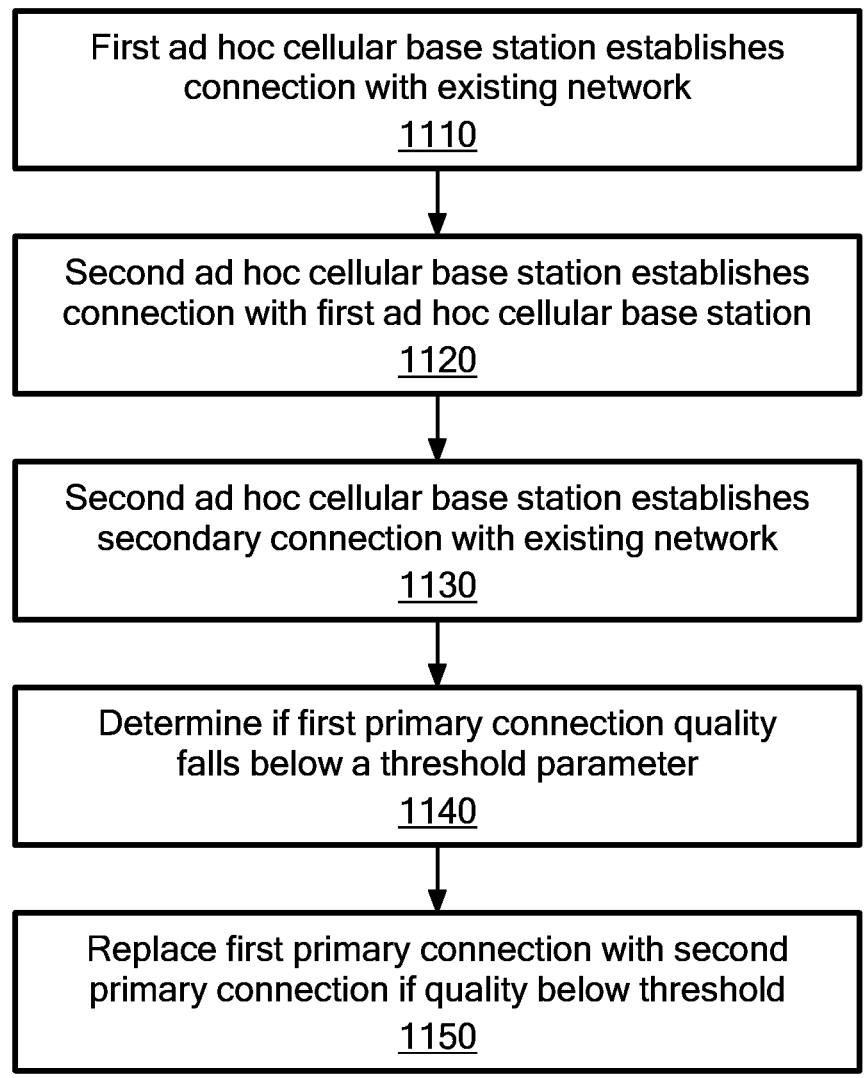
FIG. 11 illustrates the steps of methods for creating redundant backhaul connections within an ad hoc cellular network.

In an alternate method directed toward network resiliency in the context of an ad hoc cellular networks, and with reference to FIG. 11, a first ad hoc cellular base station 610 could establish 1110 a first primary connection with an existing cellular network. A second ad hoc cellular base station 620 could establish 1120 a backhaul connection to the first ad hoc cellular base station 610. The second ad hoc cellular base station 620 could also establish 1130 a second primary connection with the existing network. The first ad hoc cellular base station 610 or second ad hoc cellular base station 620 could determine 1140 on an ongoing basis if the quality of the first primary connection falls below a threshold value. Threshold values could be determined by standards such as, without limitation, an RSSI or the 3GPP 36.104 standard. If the quality of the first primary connection does fall below a certain threshold, the first primary connection could be replaced 1150 by the second primary connection.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A method of establishing an ad hoc cellular network having an ad hoc cellular base station comprising the steps of:
   a. analyzing a speed to determine a mobility state of an ad hoc cellular base station;
   b. querying a local or remote cache stored in a computing server to determine a backhaul configuration or an access configuration for the ad hoc cellular base station, wherein the mobility state is a factor used to determine the backhaul configuration or the access configuration;
   c. receiving the backhaul configuration or the access configuration for the ad hoc cellular base station from the local or remote cache;
   d. evaluating an operational parameter of a neighboring cellular base station;
   e. determining if the access configuration or backhaul configuration should be updated based on the operational parameter; and f. transmitting or receiving an access signal or a backhaul signal using the access configuration or the backhaul configuration.

2. The method of claim 1 further comprising a second ad hoc cellular base station further comprising the steps of:
   a. receiving from a local or remote cache a second location, a second mobility state, or a second travel direction for a second ad hoc cellular base station within the ad hoc cellular network;
   b. evaluating at least one of the backhaul configuration, the access configuration, the second location, the second mobility state, or a second travel direction to determine if either the backhaul configuration or the access configuration should be changed to an updated backhaul configuration or an updated access configuration; and
   c. transmitting an access signal or a backhaul signal using the access configuration, the updated access configuration, the backhaul configuration, or the updated backhaul configuration.

3. The method of claim 1 wherein the speed is determined by using location data or direction data for the ad hoc cellular base station.

4. The method of claim 1 further comprising the steps of:
   a. altering a power level of an access radio or a backhaul radio having transmit or receive hardware configured to operate over the access configuration or backhaul configuration;
   b. using a wireless mesh backhaul connection; and
   c. altering an antenna configuration based upon an access configuration or a backhaul configuration.

5. The method of claim 1 further comprising the steps of:
   a. communicating a decision to hand-off a data or voice session of a user being serviced by a source ad hoc cellular base station to a destination cellular base station; and
   b. exchanging messaging information between the source ad hoc cellular base station and the destination cellular base station.

6. The method of claim 1 further comprising the steps of:
   a. communicating a decision to hand-in a data or voice session of a user being service by a source cellular base station to a destination ad hoc cellular base station; and
   b. exchanging messaging information between the source cellular base station and the destination ad hoc cellular base station.

7. The method of claim 1 wherein the access configuration and the backhaul configuration are the within the same frequency and band.

8. The method of claim 1 wherein the access signal or the backhaul signal use full duplex wireless communication.

9. The method of claim 1 further comprising the steps of:
   a. detecting a coverage gap;
   b. establishing at least one wireless backhaul connection to a core network using an antenna having a gain greater than 0 dB; and
   c. using the access configuration to transmit or receive signals on an access radio.

10. The method of claim 1 wherein the access configuration or the backhaul configuration is determined based on a power source of the ad hoc cellular base station.

11. The method of claim 1 wherein the access configuration or the backhaul configuration is determined based on an operational parameter of the ad hoc cellular network.

12. The method of claim 1 further comprising the ad hoc cellular base station authenticating a user equipment by using an already authenticated user communicating with other users within the ad hoc cellular network.

13. The method of claim 1 further comprising assigning a priority to a user.

14. The method of claim 1 wherein a backhaul connection of the ad hoc cellular base station to a cellular network is given priority treatment based on an operational parameter of the ad hoc cellular base station.

15. The method of claim 5 further comprising exchanging messaging information with a core cellular network.

16. The method of claim 8 further comprising establishing a second backhaul connection using either a cellular or a mesh protocol between the ad hoc cellular base station and a second cellular base station.

17. A method of integrating an ad hoc cellular base station into a fixed cellular network comprising the steps of:
   a. analyzing a speed to determine a mobility state of an ad hoc cellular base station;
   b. querying a local or remote cache stored in a computing server to determine a backhaul configuration or an access configuration for the ad hoc cellular base station, wherein the mobility state is a factor used to determine the backhaul configuration or the access configuration;
   c. receiving the backhaul configuration or the access configuration for the ad hoc cellular base station from the local or remote cache;
   d. evaluating an operational parameter of a neighboring cellular base station;
   e. determining if the access configuration or backhaul configuration should be updated based on the operational parameter; and
   f. transmitting or receiving an access signal or a backhaul signal using the access configuration or the backhaul configuration.

18. The method of claim 17 further comprising a second ad hoc cellular base station further comprising the steps of:
   a. receiving from a local or remote cache a second location, a second mobility state, or a second travel direction for a second ad hoc cellular base station within the ad hoc cellular network;
   b. evaluating at least one of the backhaul configuration, the access configuration, the second location, the second mobility state, or a second travel direction to determine if either the backhaul configuration or the access configuration should be changed to an updated backhaul configuration or an updated access configuration; and
   c. transmitting an access signal or a backhaul signal using the access configuration, the updated access configuration, the backhaul configuration, or the updated backhaul configuration.

19. The method of claim 17 wherein the speed is determined by using location data or direction data for the ad hoc cellular base station.

20. The method of claim 17 further comprising the steps of:
   a. altering a power level of an access radio or a backhaul radio having transmit or receive hardware configured to operate over the access configuration or backhaul configuration;
   b. using a wireless mesh backhaul connection; and
   c. altering an antenna configuration based upon an access configuration or a backhaul configuration.

21. The method of claim 17 further comprising the steps of:
   a. communicating a decision to hand-off a data or voice session of a user being serviced by a source ad hoc cellular base station to a destination cellular base station; and
   b. exchanging messaging information between the source ad hoc cellular base station and the destination cellular base station.

22. The method of claim 17 further comprising the steps of:
   a. communicating a decision to hand-in a data or voice session of a user being service by a source cellular base station to a destination ad hoc cellular base station; and
   b. exchanging messaging information between the source cellular base station and the destination ad hoc cellular base station.

23. The method of claim 17 wherein the access configuration and the backhaul configuration are the within the same frequency and band.

24. The method of claim 17 wherein the access signal or the backhaul signal use full duplex wireless communication.

25. The method of claim 17 further comprising the steps of:
   a. detecting a coverage gap;
   b. establishing at least one wireless backhaul connection to a core network using an antenna having a gain greater than 0 dB; and
   c. using the access configuration to transmit or receive signals on an access radio.

26. The method of claim 17 wherein the access configuration or the backhaul configuration is determined based on a power source of the ad hoc cellular base station.

27. The method of claim 17 wherein the access configuration or the backhaul configuration is determined based on an operational parameter of the ad hoc cellular network.

28. The method of claim 17 further comprising the ad hoc cellular base station authenticating a user equipment by using an already authenticated user communicating with other users within the ad hoc cellular network.

29. The method of claim 17 further comprising assigning a priority to a user.

30. The method of claim 17 wherein a backhaul connection of the ad hoc cellular base station to a cellular network is given priority treatment based on an operational parameter of the ad hoc cellular base station.

31. The method of claim 27 further comprising exchanging messaging information with a core cellular network.

32. The method of claim 24 further comprising establishing a second backhaul connection using either a cellular or a mesh protocol between the ad hoc cellular base station and a second cellular base station.

33. The method of claim 6 further comprising exchanging messaging information with a core cellular network.

34. The method of claim 22 further comprising exchanging messaging information with a core cellular network.

* * * * *